United States Patent [19]

Martin

[11] 4,125,871
[45] Nov. 14, 1978

[54] PORTABLE DATA ENTRY DEVICE

[75] Inventor: Peter G. Martin, Arlington, Mass.

[73] Assignee: Arthur D. Little, Inc., Cambridge, Mass.

[21] Appl. No.: 766,222

[22] Filed: Feb. 7, 1977

Related U.S. Application Data

[63] Continuation-in-part of Ser. No. 603,878, Aug. 11, 1975.

[51] Int. Cl.² ............................ G06F 3/02; H03B 5/04
[52] U.S. Cl. .................................. 364/900; 331/66; 365/211
[58] Field of Search ... 364/900 MS File, 200 MS File; 331/176, 175, 66; 365/211, 73, 222, 212; 324/105

[56] References Cited

U.S. PATENT DOCUMENTS

| | | | |
|---|---|---|---|
| 3,064,241 | 11/1962 | Schneider | 365/211 |
| 3,641,461 | 2/1972 | Mrozek | 331/176 X |
| 3,733,588 | 5/1973 | Conn | 364/200 |
| 3,835,458 | 9/1974 | Mrazek | 365/211 |
| 3,967,263 | 6/1976 | Chang et al. | 364/900 |
| 4,015,218 | 3/1977 | Sanderson | 331/176 X |
| 4,015,219 | 3/1977 | Kawagoe et al. | 331/176 X |
| 4,019,174 | 4/1977 | Vanderpool et al. | 364/900 |
| 4,020,426 | 4/1977 | Helle | 331/176 X |

Primary Examiner—Mark E. Nusbaum
Attorney, Agent, or Firm—Weingarten, Maxham & Schurgin

[57] ABSTRACT

A portable data entry device wholly contained within a small housing and for the manual entry of numerical and code data which can be conveyed to a remote data processor upon command. The device includes an electronic memory capable of storing a plurality of multiple character records and includes manually operable controls for sequencing through the memory for review and updating of previously entered data. A connector is provided on the housing by which the device can be directly connected to a data system for the readout of the stored data. The device is self powered and contains circuitry operative to conserve available energizing power.

13 Claims, 19 Drawing Figures

PORTABLE DATA ENTRY DEVICE

RELATED APPLICATION

This application is a continuation-in-part of application Ser. No. 603,878, filed Aug. 11, 1975.

FIELD OF THE INVENTION

This invention relates to data storage apparatus and more particularly to a portable data entry device for the temporary storage of data.

BACKGROUND OF THE INVENTION

Many types of data entry and storage systems are known wherein data is retained within a storage medium for later retrieval and use. Most data storage systems are of a size and configuration useful only at a fixed location and usually in permanent association with an overall data processing system. For many purposes it would be useful to have a portable data entry system and one such known system employs a magnetic tape as a storage medium and an associated tape transport which limits the size of the apparatus and which consumes relatively high power.

SUMMARY OF THE INVENTION

In brief, the present invention provides an extremely compact and portable data entry device readily usable in hand held manner for the temporary storage of data which can be retrieved upon command by a remote data system to which the novel device can be temporarily connected. The device includes an electronic memory capable of storing a plurality of records each composed of a plurality of multiple bit characters. A data keyboard is provided for the entry of numerical and code data and control keys are provided by which memory addresses can be sequentially accessed for the entry of data or review of the data content of the memory. Data entered into memory is visually displayed for verification purposes. The device is typically embodied within a palm size housing and is implemented in microcircuit form requiring very little power. The device is completely self contained and includes an output connector by which direct electrical connection is made to an associated data system to which data stored in the device memory can be conveyed upon command.

The invention finds particular application where data is to be accumulated by a user moving about different locations. For example, in a supermarket or other store or warehouse, a clerk can move through the isles with the invention to record stocking information. The invention is also useful, for example, in the reading of utility meters where an individual employs the invention on his rounds to record meter readings for later transfer to a data system for billing purposes.

A particular feature of the invention is the energy conservation attained by utilizing battery power only when essential for particular functions of the data entry device. The input and output stages of the electronic memory of the data entry device are enable only when a selected record of the memory is accessed for entering data or for display. In addition, the display is blanked when data is absent from an accessed memory record. Further power conservation is achieved by adjustment of the rate of clocking pulses for the memory to the minimum reliable rate to produce proper memory operation.

DESCRIPTION OF THE DRAWING

The invention will be more fully understood from the following detailed description taken in conjuntion with the accompanying drawings, in which.

DETAILED DESCRIPTION OF THE INVENTION

Figure 1:
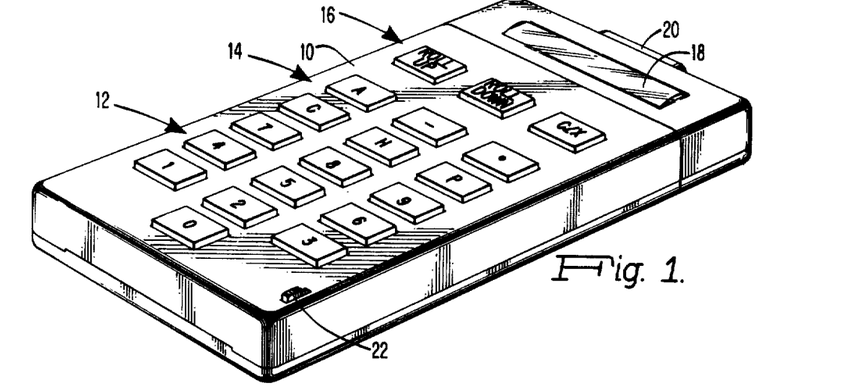
FIG. 1 is a pictorial view of the portable data entry device according to the invention in typical housing configuration.

The portable data entry device according to the invention is shown in preferred implementation in FIG. 1 and includes a housing 10 having on a front panel thereof a numerical keyboard 12 for the manual entry of numerical data, code keys 14 for the manual entry of coding information in association with the numerical data, control keys 16 labeled roll-up, roll-down and CLX and an alpha-numeric display 18. A connector 20 is provided at the back of housing 10 by which the data entry device is interconnected with a data processing or other system for the readout of data stored in the portable device for subsequent processing and utilization. A power switch 22 is also provided on housing 10 for energizing and de-energizing the device circuitry. The overall device is preferably of palm size to be readily carried and to be easily operated when hand held, much as with a pocket calculator. It will be appreciated, however, that the invention can be embodied in other sizes and configurations as may be desirable to suit particular operating requirements for particular portable data entry purposes.

The device is completely self contained and self powered by an internal battery source. The logic is of microcircuit form operative with relatively low power consumption to extend the useful battery life.

In operation, numerical data and code data are manually entered into the device memory by means of selected ones of respective keys 12 and 14, the data thus entered being shown on display 18 for visual verification. If an erroneous data entry has been made or if an entry is to be changed, the data stored in the present memory location is cleared by the CLX key 16 so that the correct data can then be entered by means of the appropriate numerical and code keys 12 and 14. Alternatively new data can be written over the presently stored data, the newly entered data then being stored in memory and shown on display 18. By means of the roll-up key 16, the next location in memory is addressed for a subsequent data entry. Each actuation of the roll-up key causes stepping of the memory address to the next sequential memory location. Each actuation of the roll-down key causes stepping of the memory address to the next preceding memory location. In this manner the memory can be manually cycled in both a forward and reverse direction through all memory locations and is, therefore, sequentially accessible for review of particular data entries previously stored or for altering previously entered data. At any presently selected memory location, the contents of the data stored in that location will be visually displayed.

When it is desired to read out the contents of all data then stored in the memory, the device is directly interconnected with a data processing or other system by means of connector 20 and an associated electrical cable. Upon command provided by the data processing system or by the device, the content of the memory is sequentially conveyed to the data system for storage and/or processing.

Figure 2:
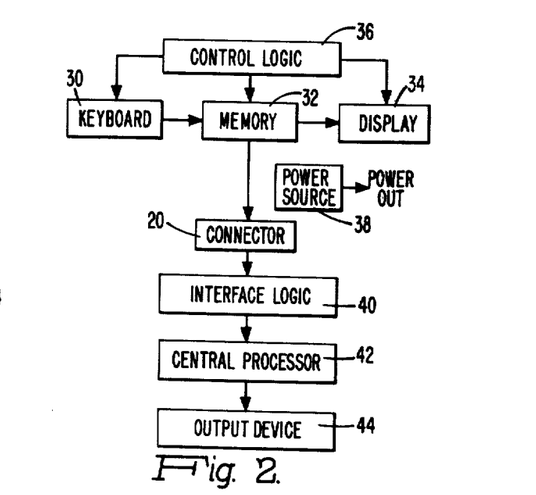
FIG. 2 is a block diagram representation of the invention and associated data system.

The device logic is broadly shown in FIG. 2 and includes keyboard 30 containing the data, code and control keys described above and coupled to an electronic data memory 32 which, in turn, is coupled to a display 34. Control logic 36 which includes a local clock governs data entry and device operation. Power is locally provided by a battery source 38 which may include a charging circuit energized from an external supply. The device can be coupled via connector 20 to interface logic 40 associated with a central processor 42. This coupling can be made by any suitable wire or wireless path. The central processor provides an appropriate command to memory 32 to cause readout of the data content thereof to the central processor for storage and/or processing. The central processor can drive a suitable output device 44 such as a printer for the presentation of output data derived in whole or in part from the data content of memory 22.

Figure 3:
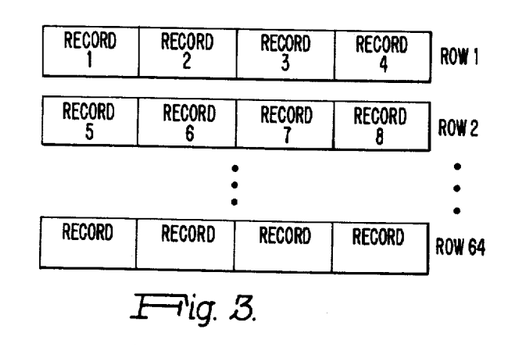
FIG. 3 and FIG. 4 are schematic representations of the conceptual orgainzation of the memory of the invention.
Figure 4:
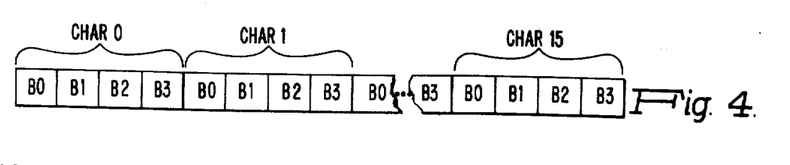
Figure 5:
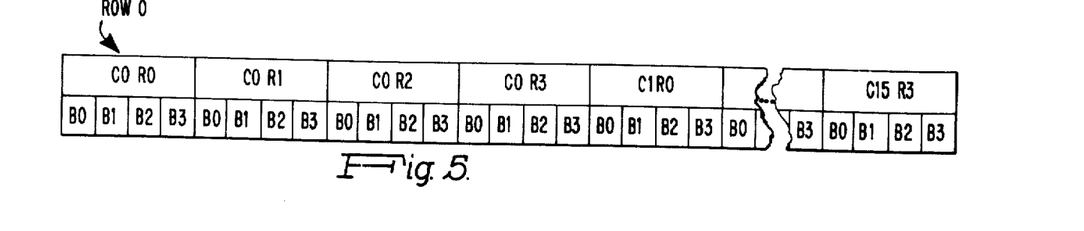
FIG. 5 is a schematic representation of the actual organization of a row within the memory of the invention.

The memory 32 is typically a solid serial memory such as a charge coupled device memory, a preferred implementation being an Intel 2416 integrated serial memory which is composed of 64 recirculating shift registers each having 256 bits. The conceptual organization of the memory is shown in FIG. 3 and includes 64 rows of storage, each row containing four records, each of 16 characters. Each character is composed of 4 bits as depicted in FIG. 4. The actual memory organization is as in FIG. 5. Each shift register representing a row of the memory contains all corresponding characters for four records. Thus as shown in FIG. 5 row 0 contains the first character (CO) for records 0 to 3, the second character (C1) for records 0 to 3, etc. This memory organization provides easier implementation of the addressing logic than the conceptual organization described above.

Figure 6:
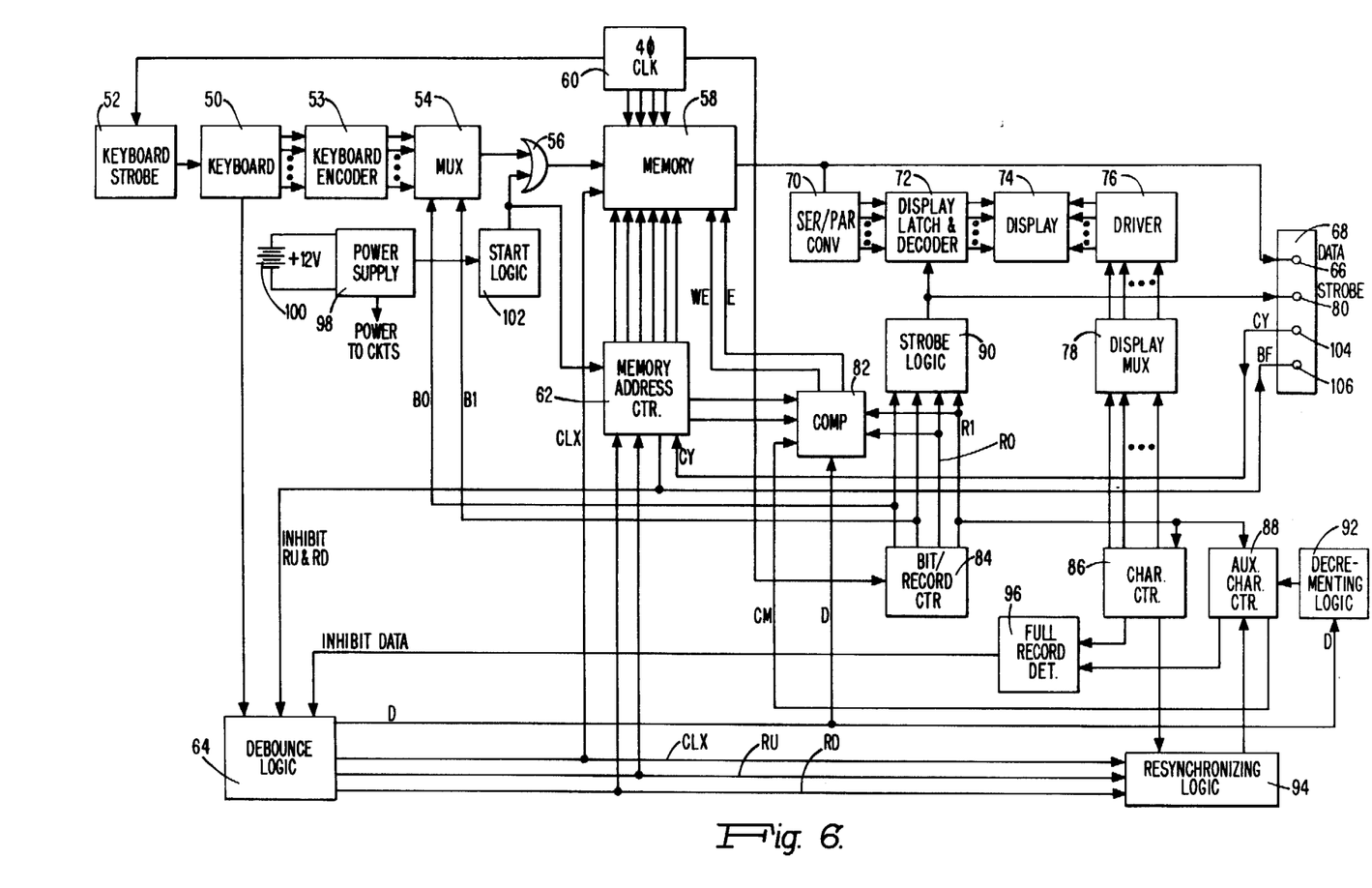
FIG. 6 is a block diagram representation of the logic circuitry of the invention.

The logic circuitry is shown more particularly in FIG. 6. A keyboard 50 which includes all numerical data and control keys is strobed via a keyboard strobe circuit 52 and provides coded representations of actuated keys to a keyboard encoder 53 which drives a multiplexer 54. The encoder 53 can be a Motorola MC14532, and multiplexer 54 can be a Motorola MC14539. The multiplexer provides serial output data via an OR gate 56 to the data input of electronic memory 58, the operation of which is governed by a four-phase clock 60 and which is addressed by a memory address counter 62. Address counter 62 can be a Motorola MC14516. Keyboard 50 is also coupled to a debounce circuit 64, such as a Motorola MC14490 which provides in response to actuation of keys of the keyboard corresponding control commands labeled CLX, roll-up (RU), roll-down (RD), and "data" (D). The data output of memory 58 is coupled to data terminal 66 of output connector 68 and is also coupled to a serial to parallel converter 70 which provides parallel output signals to a display latch and decoder 72 which, in turn, is coupled to display 74. This display is also coupled to a driver circuit 76 which is energized by a display multiplexer 78. The display 74 can be a Hewlett-Packard 5082-7400 seven-segment monolithic display; driver 76 can be a Texas Instruments SN75492; and multiplexer 78 can be a Mostek MK 5002.

The memory address counter 62 is coupled to a comparator 82 which also receives inputs from a bit/record counter 84. Counter 84 also provides an input to a character counter 86 and to an auxiliary character counter 88 as well as providing an input to strobe logic 90, such as a Mostek MK 5002, and which, in turn, provides a strobe signal to display latch and decoder 72 and to strobe terminal 80 of output connector 68. Decrementing logic 92 provides a control signal to auxiliary character counter 88 as does the resynchronizing logic 94 which receives an input signal from character counter 86 as well as control commands. The character counter provides a driving signal to multiplexer 78. A full record detector 96 receives input signals from character counter 86 and auxiliary character counter 88 and provides an inhibit signal to debounce circuit 64.

Power is supplied to the circuitry by means of a power supply 98 which includes a battery 100. Typically a 12 volt battery is employed with power supply 98 providing +12 and −5 volts to the logical elements. The power supply is also coupled to start logic 102 which provides an output signal via OR gate 56 to the data input of memory 58. The control commands from debounce circuit 64 are applied to the associated logical elements as indicated. In operation, during initial energization of the device by switch-on of power supply 98, start logic 102 causes the entry of all logical ones into memory 58 to define an initial memory condition representing zero data. The keyboard 50 is strobed by keyboard strobe 52 and upon actuation of a numerical or code key of keyboad 50 a parallel code is provided by the keyboard to keyboard encoder 53 which provides a parallel output code representing the actuated key. Multiplexer 54 is operative to convert this output code to a serial representation of the key data for entry into the intended location of memory 58. Upon actuation of a numerical, code or control key of keyboard 50, a signal is applied to debounce logic 64 which provides corresponding data or control commands. Logic 64 provides a data (D) command in response to actuation of a numerical or code key and clear (CLX), roll-up (RU) and roll-down (RD) commands in response to actuation of the corresponding control keys of keyboard 50. These commands are employed in governing operation of the device logic as will be described. The debounce logic 64 is also operative to discriminate between a valid key actuation and spurious contact closure and to provide the appropriate commands only upon valid key actuation.

The memory 58 is in continuous recirculation with keyboard data being entered into the next available memory location when that location is detected. In the embodiment being described wherein a solid state serial memory composed of a plurality of recirculating shift registers is employed, each of the shift registers is in recirculation. Address counter 62 operates in a static manner to address a particular row of the memory and a record within the selected row. Actuation of the numerical or code keys will cause entry of the corresponding key data into successive character positions of the addressed record. Each character stored in the addressed record of the memory will be displayed on display 74.

The bit/record counter 84 denotes which record is currently accessed by memory 58. When the record denoted by the two most significant bits of counter 84 corresponds with the record denoted by two least significant bits of address counter 62, comparator 82 provides a write enable (WE) command to memory 58, provided the other requisite commands are also present. Counter 84 also provides an output indication (B0, B1) to multiplexeer 54 for controlling the order of bits encoded during the parallel-to-serial conversion. The character counter 86 and auxiliary character counter 88 operate on a continuous recirculating basis and are stepped in synchronism with each other and with memory 58. When the auxiliary character counter 88 reaches its zero state a character match (CM) command is provided to comparator 82 which will provide the write enable command for the entry of key data into memory when the data command is present and the intended record location is detected by counter 84. Each data command causes decrementing logic 92 to decrement counter 88 by one count with respect to character counter 86 and, in this manner, counter 88 provides identification of the next character position in which key data is to be entered. Character counter 86 provides identification of all character positions in which key data has already been entered and enables the display multiplexer 78 such that key data stored in memory 58 is shown on display 74.

The display 74 is typically a multi-segment alphanumeric light emitting diode (LED) display, the segments of which are driven by display latch and decoder 72 and by driver 76. Since the data in memory 58 is being recirculated on a continuous basis, data is provided to display 74 at sampled intervals; however, the sampling rate is sufficiently high that continuous display of data is perceived by a viewer.

The resynchronizing logic 94 is operative upon a CLX, RU or RD command to resynchronize auxiliary character counter 88 with character counter 86. The full record detector 96 monitors counters 86 and 88 and in response to a maximum difference between the states of these counters, in the illustrated embodiment a difference of 16 states, produces an inhibit data signal to logic 64 to prevent further provision of a data (D) command since the then present record of memory 58 is full.

In the illustrated embodiment up to 16 numerical and code characters can be stored in a single record within the memory. Actuation of the roll-up key provides a subsequent memory record into which can also be stored up to 16 numerical and code characters. Key data can be similarly stored in each of the 16 memory records. At any time, the previously stored contents of the memory can be reviewed by use of the roll-down key by which each predecessor entry of the memory can be accessed for viewing of the data content thereof, and if desired, for correction or replacemment of data therein. Actuation of the roll-up or roll-down keys causes provision of a corresponding RU or RD command to address counter 62. The RU command increments the address counter 62 to its next sequential address, while the RD command decrements counter 62 to its previous address.

In order to read out the stored data within memory 58, the device is coupled by means of connector 68 to a data system or other associated system to which the stored data is to be conveyed. A cycle (CY) command is provided via terminal 104 by the data system to address counter 62 to commence the cycling of the address counter through its address repertory. At the initial address of counter 62, a begin file (BF) command is provided to terminal 106 which denotes to the data processing system the commencement of the data file being read out. The BF command is also applied to logic 64 to inhibit the provision of any roll-up or roll-down commands during normal operation if the end of memory is reached. Address counter 62 cycles through each of its addresses to cause readout of the data contents of these addresses in a sequential manner via data terminal 66. The strobe signal provided at terminal 80 provides a clock for data transfer and typically clocks a serial to parallel converter in the data system. After readout of the entire contents of memory 58, denoted for example by the presence of a subsequent BF signal, the CY command is discontinued by the data system which causes discontinuance of the readout operation. For subsequent data entry use, the memory 58 is initialized by being again reloaded with all ones, such as by switch off and then on of power switch 22.

The device operates with minimum power in order to maximize the useful life of the battery source. Although the memory 58 is in continuous operation, the input and output stages of the memory are energized only when necessary. This is achieved by connecting the E command output signal from comparator 82 to the chip enable and select terminals of memory 58, this E command being produced when the record in counter 84 corresponds with the record in counter 62. In this manner energy is saved since the input and output stages which consume a significant amount of power, are only energized when needed for entering data or driving the output display. In addition, the display is blanked when an unused record is addressed in memory, also to conserve battery power. Such blanking is accomplished by the absence of an output from decoder 72 in the presence of an all ones code applied thereto.

In a dynamic memory, such as the charge coupled device serial memory described above, the memory must be continuously clocked to avoid loss of data. The circuitry generating the clock pulses contributes significantly to the power consumption of the data entry device, power consumption being related to the clock rate, with power dissipation increasing with increasing clock frequency. It is known that leakage current in a semiconductor device approximately doubles for every 10° C. rise in temperature. In a dynamic serial semiconductor memory, the minimum usable clock frequency is a function of the rate at which stored charge is lost by leakage. Such memories usually are specified to have a clock frequency sufficiently high to accommodate an entire operating temperature range of say 0°–70° C. For the Intel 2416 charge coupled device memory described above, the minimum specified clock frequency is 110 kHz. An object of this invention is to adjust the clock frequency in accordance with the operating temperature actually present to thereby employ a minimum clock rate sufficient for proper memory operation without loss of data, while minimizing the power consumption necessary to achieve such proper memory operation. The clock frequency is caused to track with temperature to optimize power consumption for a particular temperature within an operating range.

Figure 7:
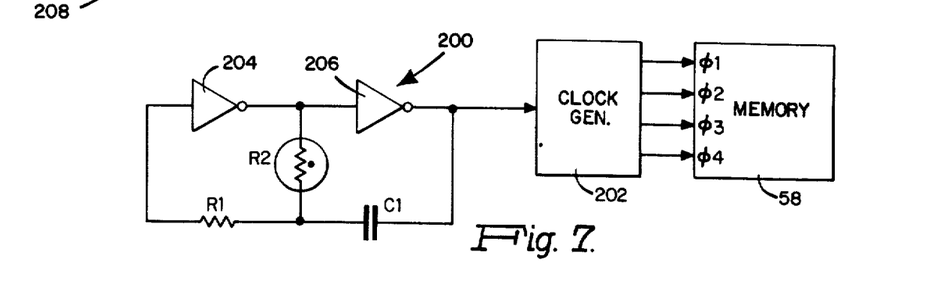
FIG. 7 is a block diagram representation of the variable rate clock circuit according to the invention.

Referring to FIG. 7 there is shown a clocking circuit which in the embodiment of FIG. 6 is identified as four-phase clock 60. An oscillator 200 is coupled to a clock generator 202 which provides four-phase clock signals to memory 58 which is a charge coupled device memory or other dynamic solid state memory. The oscillator employs a pair of CMOS inverters 204 and 206 connected as shown with a resistor R1, a capacitor C1 and a thermistor R2. The oscillator circuit is itself known and can be implemented by commercially available CMOS circuits such as an RCA model CD4069B Hex Inverter circuit. For purposes of the present invention the thermistor R2 provides a temperature dependent oscillator which is operative to generate clock pulses of a rate variable in accordance with temperature sensed by the thermistor. The oscillator can be otherwise implemented by known oscillator circuit techniques to produce clock pulses of a rate dependent on sensed temperature. For example, temperature can be sensed by the forward voltage drop of a pn junction, or other temperature dependent element which is part of an oscillator circuit. The rate of the clock pulses provided by oscillator 200 is such to be above the rate at which data in memory can be lost, and the oscillator is implemented to produce an intended range of clock rates for the particular memory being driven.

Figures 8, 9:
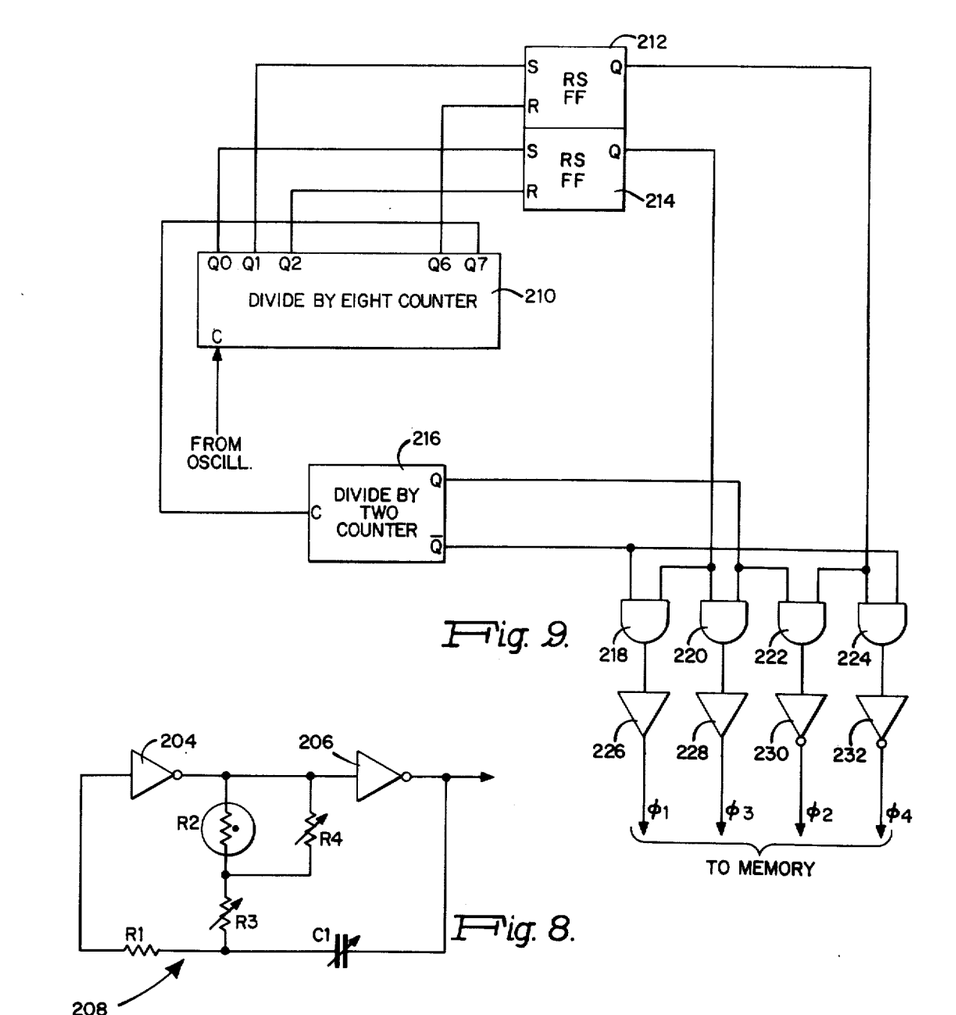
FIG. 8 is a schematic representation of an alternative varible rate oscillator useful in the invention.
FIG. 9 is a schematic representation of a circuit for generating four-phase clock pulses for memory operation.

An alternative oscillator circuit is shown in FIG. 8 and differs from oscillator 200 by the addition of potentiometers R3 and R4 and variable capacitor C1. In conjunction with capacitor C1, the potentiometer R3 in series with thermistor R2 is employed to manually adjust the maximum clock rate, while potentiometer R4 in shunt with thermistor R2 is employed to manually set the minimum clock rate. In typical implementation, resistor R1 is 2.7 KΩ, while capacitor C1 is 100 pf, and potentiometers R3 and R4 are 5 KΩ and 100 KΩ respectively. Thermistor R2 is 5 KΩ at 25° C. and having a negative temperature coefficient which causes the resistance to reduce by a factor of 9.1 over a temperature range of 0° to 50° C. In the preferred embodiment, the oscillator clock rate is variable from 80 to 800 kHz over the operating temperature range.

The clock generator 202 which in response to the clock pulses from oscillator 200 or 208 provides four-phase clock signals for the memory is shown in FIG. 9 and includes a divide-by-8 counter 210 having decoded outputs and receiving the clock pulses from the oscillator. The counter 210 is coupled to a pair of RS flip-flops 212 and 214 and to a divide-by-2 counter 216. The counters 210 and 216 and flip-flops 212 and 214 are cooperative to provide gating signals to AND gates 218, 220, 222 and 224 which drive respective buffer amplifiers 226, 228, 230 and 232. Buffers 230 and 232 are of the inverting type. The output signals from the buffers are the four-phase clock signals applied to memory 58. The circuit is implemented preferably in integrated circuit form. The counter 210 can be an RCA CD4022, the counter 216 can be an RCA CD4027 and the flip-flops 212 and 214 can be an RCA CD4043. The buffers 226 and 228 are typically RCA CD4050 buffers, while buffers 230 and 232 are typically RCA CD4049 inverting buffers. The gates 218 through 224 are typically RCA CD4081 AND gates.

Figure 10A:
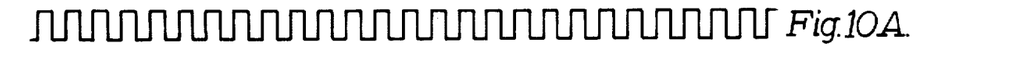
FIGS. 10A through 10I are timing diagrams useful in illustrating the operation of the variable rate clock circuit.
Figure 10B:
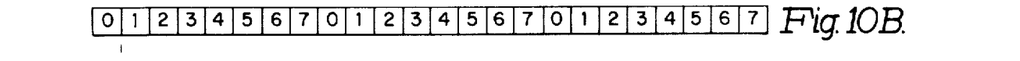
Figure 10C:
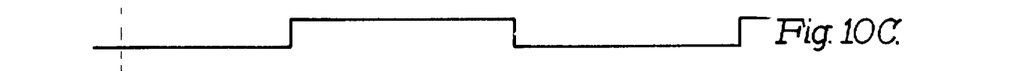
Figure 10D:
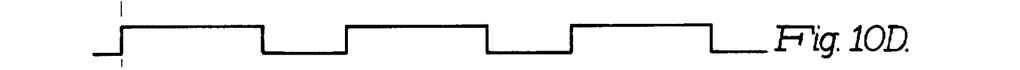
Figure 10E:
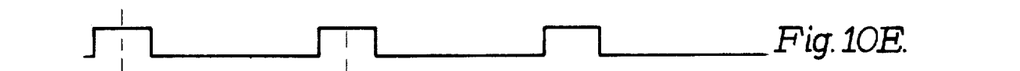
Figure 10F:
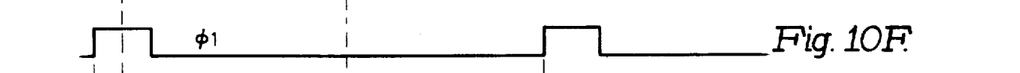
Figure 10G:
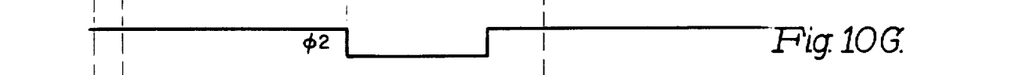
Figure 10H:
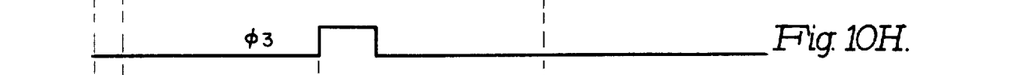
Figure 10I:
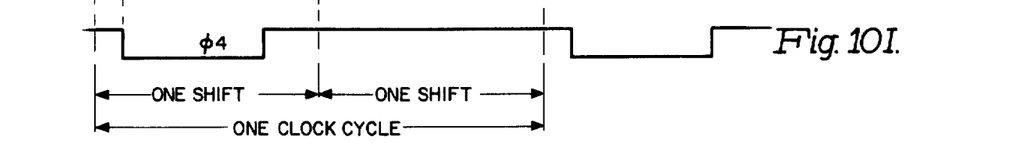

The logic circuitry of FIG. 9 is operative in well known manner to produce the four-phase output signals for memory clocking. The circuit operation is best discussed in association with the timing diagrams of FIGS. 10A through 10I. The clock signals provided by oscillator 200 or 208 are shown in FIG. 10A, while FIG. 10B shows the state of counter 210. The Q output of counter 216 is shown in FIG. 10C, and it will be appreciated that the $\overline{Q}$ output is the complement of the waveform of FIG. 10C. The waveforms of FIGS. 10D and 10E are, respectively, the Q outputs of flip-flops 212 and 214. The signals are combined by the AND gates to produce the signals shown in FIGS. 10F through 10I, for application to the memory. The memory 58 also receives the address signals from memory address counter 62, the input stage of the memory receiving the write enable (WE) command, the clear (CLX) signal and the multiplexed data from the keyboard of the data entry device. The output stage of the memory receives the enable (E) command and provides the serial output data to the display. It will be appreciated that the clock generator 202 and the particular signals provided can be of other forms in accordance with the particular memory employed.

Figure 11:
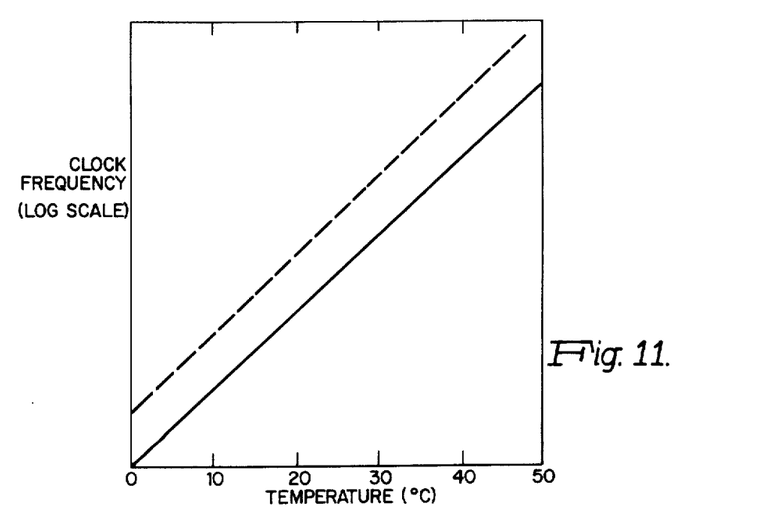
FIG. 11 is a plot of clock frequency versus temperature useful in illustrating operation of the clock circuit.

The desired clock frequency range in relation to temperature is illustrated in FIG. 11, the dotted curve illustrating the range of clock frequencies for corresponding temperatures. The solid curve in FIG. 11 shows the minimum clock frequency which can be used at any temperature within the operating range, and is extrapolated from manufacturer's data. The dotted curve is above the solid curve to provide a safe operating margin and to prevent loss of data.

In general, the buffer circuits driving the memory clock lines are the major source of power drain. In the illustrated embodiment, the four buffers 226–232 driving a single Intel 2416 memory chip, require 3 ma of current at the supply voltage of 12V, at the manufacturer's recommended minimum clock frequency of 110 kHz. By use of this invention, the current drain can be reduced to about 0.5 ma at 25° C., and to about 0.1 ma at 0° C. A significant power saving is thereby provided, especially in a system having more than one memory and associated buffer drive.

The invention by reason of its small size and self contained operation is especially useful for the temporary storage of data "in the field". The invention can be thought of as an electronic version of a notebook and is usable in similar manner for recording information for later use.

It will be appreciated that the implementation of the invention can vary to suit specific performance requirements. The invention is not, therefore, to be limited by what has been particularly shown and described except as indicated in the appended claims.

What is claimed is:

1. A portable data entry device comprising:
  a housing of size and configuration for portable use;
  a dynamic continuously clocked serial solid state memory within said housing, said memory having a minimum useable clock rate which is a function of operating temperature, and having input and output stages;
  means on said housing for manual entry of data into said memory;

control means on said housing for manual accessing of locations within said memory for review of data previously entered in said memory locations;

a display on said housing for visual representation of data stored in said memory by said manual entry means;

means within said housing for energizing said device;

connector means on said housing for connection to a data utilization system by which data stored in said memory can be conveyed to said data utilization system; and clock means for providing clock signals to said memory and in which the power consumption of the clock means is related to the rate of clock signals therefrom, and including temperature sensing means for sensing an operating temperature and means for varying the rate of said clock signals in accordance with sensed operating temperature to provide clock signals of said minimum rate for the sensed operating temperature thereby to provide proper memory operation at minimum power consumption.

2. A portable data entry device according to claim 1 wherein said clock means includes:

a variable rate oscillator operative to provide output pulses of a rate corresponding to a sensed operating temperature; and circuit means operative in response to said output pulses for providing clock pulses of a format suitable for driving said memory.

3. A portable data entry device according to claim 1 wherein said memory is a charge coupled device recirculating shift register memory.

4. A portable data entry device according to claim 3 wherein said clock means includes:

a variable rate oscillator operative to provide output pulses of a rate corresponding to a sensed operating temperature; and circuit means for providing four-phase clock signals for driving said charge coupled device memory.

5. A portable data entry device according to claim 1 and further including:

means operative to provide a signal indication of accessed memory locations; and means operative in response to said signal indication for energizing said input and output stages only when a selected location of said memory is accessed for entering data, for readout of data or for display, data stored in said memory being unaffected when said input and output stages are not energized.

6. A portable data device according to claim 1 and further including:

means operative to provide a signal indication of an accessed location of said memory containing no data; and means operative in response to said signal indication for blanking said display when data is absent from an accessed location of said memory, such that said display produces a visual output indication only when an accessed location of said memory contains data.

7. A portable data entry device according to claim 1 and further including:

means operative to provide a signal indication of accessed memory locations;

means operative in response to said signal indication for energizing said input and output stages only when a selected location of said memory is accessed for entering data, for readout of data or for display, data stored in said memory being unaffected when said input and output stages are not energized;

means operative to provide a second signal indication of an accessed location of said memory containing no data; and means operative in response to said second signal indication for blanking said display when data is absent from an accessed location of said memory, such that said display produces a visual output indication only when an accessed location of said memory contains data.

8. A portable data entry device comprising:

a portable housing;

a dynamic continuously clocked serial solid state memory within said housing for containing a plurality of records each composed of a plurality of multiple bit characters, and having input and output stages, said memory having a minimum useable clock rate which is a function of operating temperature;

keyboard means on said housing for manual entry of numerical and code data into said memory, and including:

a first control key on said housing operative upon each manual actuation to access a successive record of said memory; and a second control key on said housing and operative upon each manual actuation to access a preceding record of said memory;

multiple character display means on said housing for visual indication of numerical and code data entered by said keyboard into an accessed record of said memory;

control circuit means operative upon actuation of said keyboard to provide a data command and operative upon actuation of said first and second control keys to provide respective first and second control commands;

address counter means operative in response to said control commands to address a selected record of said memory;

counter means in synchronization with said memory and operative to enable data entry into each accessed record of said memory upon detection of an intended record and character location in response to said data command;

connector means on said housing for connection of said memory to a data utilization system for the transfer of data stored in said memory to said data utilization system;

a power source within said housing and operative to energize the circuitry of said device;

means operative to provide a signal indication of accessed memory locations;

means operative in response to said signal indication for energizing said input and output stages only when a selected location of said memory is accessed for entering data, for readout of data or for display, data stored in said memory being unaffected when said input and output stages are not energized;

means operative to provide a second signal indication of an accessed location of said memory containing no data;

means operative in response to said second signal indication for blanking said display when data is absent from an accessed location of said memory, such that said display produces a visual output indication only when an accessed location of said memory contains data; and clock means for providing clock signals in said memory and in which the power consumption of the clock means is related to the rate of clock signals therefrom, and including temperature sensing means for varying the rate of said clock signals in accordance with sensed operating temperature to provide clock signals of said minimum rate for the sensed operating temperature thereby to provide proper memory operation at minimum power consumption.

9. A portable data entry device comprising:
a housing of size and configuration for portable use;
a single dynamic continuously clocked serial solid state memory within said housing and having input and output stages, said memory having a minimum useable clock rate which is a function of operating temperature;
means on said housing for manual entry of data directly into said memory;
control means on said housing for manual accessing of each location within said memory for review and correction of data previously entered in any of said memory locations;
a display on said housing for visual representation of data stored in said memory by said manual entry means;
means within said housing for energizing said device;
connector means on said housing for direct electrical connection to a data utilization system by which data stored in said electronic memory can be conveyed to said data utilization system; and
clock means for providing clock signals to said memory and in which the power consumption of the clock means is related to its clock signal rate, and including temperature sensing means for sensing an operating temperature and means for varying the rate of said clock signals in accordance with sensed operating temperature to provide clock signals of said minimum rate for the sensed operating temperature thereby to provide proper memory operation at minimum power consumption.

10. A portable data entry device according to claim 9 and further including:
means operative to provide a signal indication of accessed memory locations; and
means operative in response to said signal indication for energizing said input and output stages only when a selected location of said memory is accessed for entering data, for readout of data or for display, data stored in said memory being unaffected when said input and output stages are not energized.

11. A portable data entry device according to claim 9 and further including:
means operative to provide a signal indication of an accessed location of said memory containing no data; and
means operative in response to said signal indication for blanking said display when data is absent from an accessed location of said memory, such that said display produces a visual output indication only when an accessed location of said memory contains data.

12. A portable data entry device according to claim 9 and further including:
means operative to provide a signal indication of accessed memory locations;
means operative in response to said signal indication for energizing said input and output stages only when a selected location of said memory is accessed for entering data, for readout of data or for display, data stored in said memory being unaffected when said input and output stages are not energized;
means operative to provide a second signal indication of an accessed location of said memory containing no data; and
means operative in response to said second signal indication for blanking said display when data is absent from an accessed location of said memory, such that said display produces a visual output indication only when an accessed location of said memory contains data.

13. For use in a portable data entry device including:
a dynamic continuously clocked serial solid state memory having a minimum useable clock rate which is a function of operating temperature;
means for manual entry of data into said memory;
control means for manual accessing of locations within said memory for review of data previously entered in said memory locations;
a display for visual representation of data stored in said memory by said manual entry means; and
means for energizing said device;
the improvement comprising:
clock means for providing clock signals to said memory and in which the power consumption of the clock means is related to the rate of clock signals therefrom, and including temperature sensing means for sensing an operating temperature and means for varying the rate of said clock signals in accordance with sensed operating temperature to provide clock signals of said minimum rate for the sensed operating temperature thereby to provide proper memory operation at minimum power consumption.

* * * * *

UNITED STATES PATENT AND TRADEMARK OFFICE
CERTIFICATE OF CORRECTION

PATENT NO. : 4,125,871
DATED : November 14, 1978
INVENTOR(S) : Peter G. Martin

It is certified that error appears in the above-identified patent and that said Letters Patent are hereby corrected as shown below:

Column 1, line 60, "enable" should read --enabled--.

Column 2, line 22, "varible" should read --variable--.

Column 3, line 42, change "solid serial" to read --solid state serial--.

Column 5, line 21, "multiplexeer" should read --multiplexer--.

Signed and Sealed this

Fifth Day of June 1979

[SEAL]

Attest:

RUTH C. MASON
Attesting Officer

DONALD W. BANNER
Commissioner of Patents and Trademarks